No. 814,764. PATENTED MAR. 13, 1906.
H. C. BAILEY.
APPARATUS FOR PURIFYING WATER BY ELECTROLYSIS.
APPLICATION FILED MAY 23, 1901. RENEWED JULY 22, 1903.

2 SHEETS—SHEET 1.

WITNESSES
Perry Gleason
Chas. P. Alber

INVENTOR
Henry C. Bailey,
BY
Emil F. Gennert
ATTORNEY

No. 814,764. PATENTED MAR. 13, 1906.
H. C. BAILEY.
APPARATUS FOR PURIFYING WATER BY ELECTROLYSIS.
APPLICATION FILED MAY 23, 1901. RENEWED JULY 22, 1903.

2 SHEETS—SHEET 2.

WITNESSES:
Perry Gleason
Chas. P. Alber

INVENTOR
Henry C. Bailey,
BY
Emil F. Grinert
ATTORNEY

UNITED STATES PATENT OFFICE.

HENRY C. BAILEY, OF ST. LOUIS, MISSOURI, ASSIGNOR TO ELECTRA-PURA WATER COMPANY, OF NEW YORK, N. Y., A CORPORATION OF NEW JERSEY.

APPARATUS FOR PURIFYING WATER BY ELECTROLYSIS.

No. 814,764.     Specification of Letters Patent.     Patented March 13, 1906.

Application filed May 23, 1901. Renewed July 22, 1903. Serial No. 166,554.

*To all whom it may concern:*

Be it known that I, HENRY C. BAILEY, a citizen of the United States, residing at St. Louis, in the State of Missouri, have invented a new and useful Improvement in Apparatus for Purifying Water by Electrolysis, of which the following is a specification.

My invention relates to apparatus for purifying water by electrolysis prior to filtration, the object being to provide an inexpensive and efficient apparatus that is easily cleaned or repaired when required.

Figure 1:
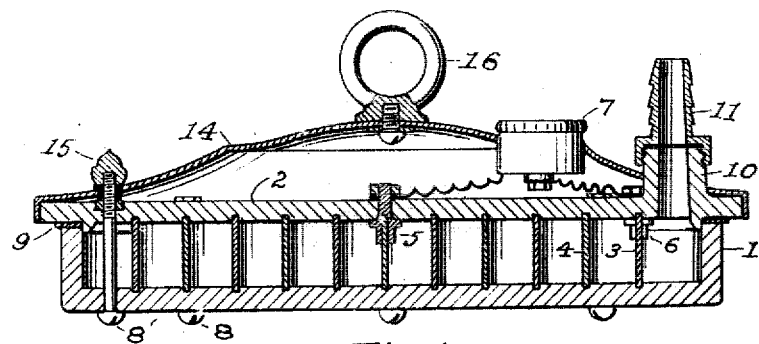
Figures 2, 3:
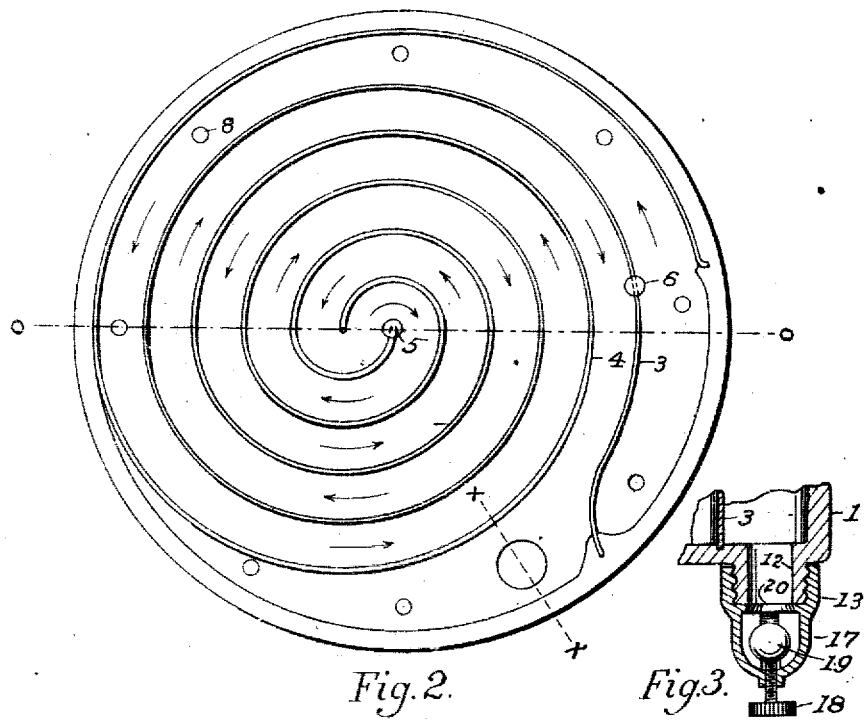
Figure 4:
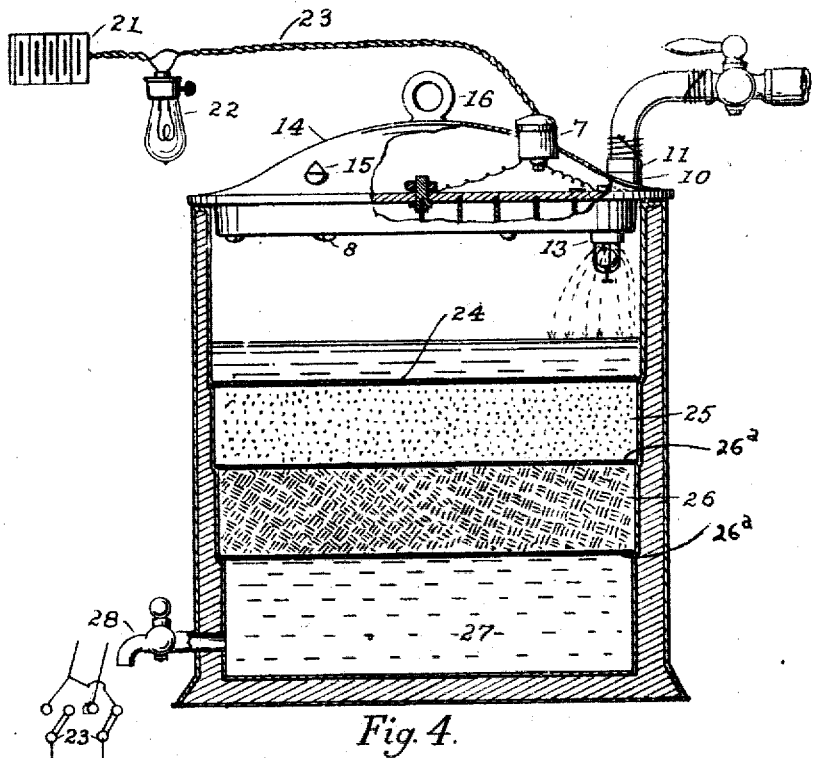
Figure 5:
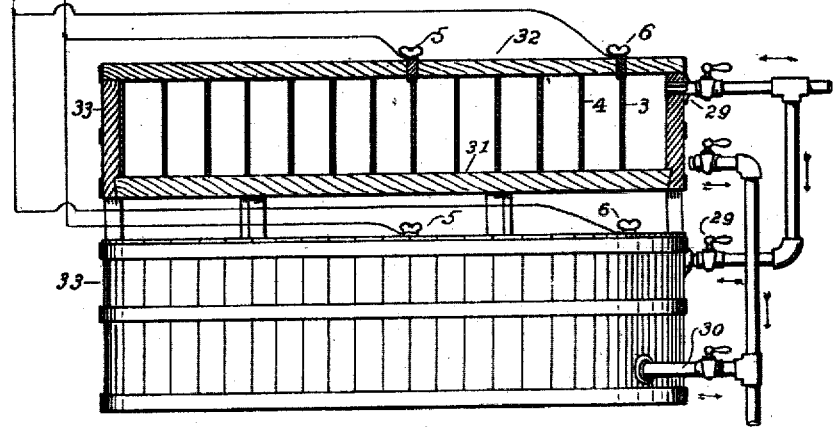

In the accompanying drawings, which form part of this specification, Figure 1 is a central sectional view on line O O of Fig. 2, showing my improved electrolytic apparatus. Fig. 2 is a plan view of the same, the cover and upper section of the insulated cover being removed to expose the circuitous channels. Fig. 3 shows the outlet-valve on line x x of Fig. 2. Fig. 4 shows the electrolytic apparatus in position on a filter of a conventional or any preferred system, the electrical and water connections being made to my improved apparatus; and Fig. 5 is a side view, partly in section, showing a duplex system for treating water electrolytically on a large scale—such, for instance, as purifiers for hotels, apartment-houses, ice-making plants, and the like.

It is well known that natural water contains many organic and inorganic, as well as mineral and metallic substances, gathered either at the source of supply or from the interior of pipes which convey the water. Microbes and bacilli and minute worms are frequently carried along in the water to the outlet.

In other electrolytic apparatus when a comparatively large quantity of water is treated it is possible for some of the above-mentioned substances to pass through without being affected. In the following described apparatus I make use of novel duplex coiled or spiral channels. The water in being forced along these channels is subjected to the influence of the electric current with which the sides are charged, and the friction of the water in its course through the channels sets up a rotary motion, thereby bringing all the molecules in contact with the sides of the channels, which channels are respectively an anode and a cathode when connected with a negative and positive element of a battery or other source of electric current.

Similar figures of reference indicate similar parts in the several views.

For domestic purposes I prefer to make the casing of my apparatus of two parts, the dished body 1 and its cover 2. They are made of any material which is an insulator or a non-conductor—such, for instance, as glass, porcelain, earthenware, rubber, vulcanized fiber, wood, and the like. For ease and cheapness of production these two parts may be pressed or molded in any well-known manner. The body and cover are provided on their inner surfaces with spiral grooves which when the casing is secured together are opposite each other. Into each groove is placed a strip of any suitable metal unaffected by water—such, for instance, as aluminium, pure or alloyed, pure tin, iron or brass coated with tin, as is commonly used in condensing and soda water apparatus. These strips or coils 3 4 are separated from each other and are only brought into electrical action when water passes through the spiral channels formed by the coiled strips. Each strip has means for connecting with an electric wire, one being negative and the other positive. I prefer to use forked studs 5 6, passing through the insulated cover. In Fig. 1 these studs are shown connected to a plug-receptacle 7. The casing is fastened together by screw-bolts 8 and nuts, as shown. A rubber or fiber gasket 9 between the two parts makes a water-tight joint. The cover is provided with a hollow projection 10 and a nipple 11, adapted for connecting with a source of water-supply. The body 1 has a similar hollow projection 12, (shown in detail in Fig. 3,) to which a regulating-valve 13 is attached. The object of this regulating-valve will be fully explained hereinafter. A cap 14 surmounts the apparatus to protect the electrical connections and to give a finished appearance to the device. The cap, which should be hollow, is fastened by means of a plurality of bolts, which may simultaneously hold the casing together, the bolts being somewhat longer and extending above the nut for this purpose, an ornamented nut 15 holding cap in place. A ring 16 or other lifting means may be used, whereby the apparatus can be handled. The strips 3 4 may be fastened in the grooves by means of shellac or any of the well-known aquatic cements.

The regulating-valve 13 is a pendent body having a plurality of arms 17 united at the center, through which a regulating-screw 18 is revolubly placed. A marble 19 is placed central of the arms above the screw, which screw when advanced upward presses the marble against a seat 20 and checks the flow of the electrically-treated water passing through the outlet, for the reason that if the supply of water entering the apparatus is small then the regulating-valve is adjusted that the discharge will be proportionate to the supply, so that the channels will be filled with water to their full capacity, and the electrically-charged strips will have their surfaces fully covered to more effectively treat the water passing between them.

Fig. 4 shows my electrolytic apparatus in full operation as placed on a filter. I do not confine myself to the use of any special type of filter, and show the combination of my improved apparatus with a filter to explain how simply they coact with each other without any material alteration being required in the filter. The receptacle 7 is connected with any source of electric supply—as, for instance, a battery 21 or dynamo. A lamp 22 or any suitable resistance can be put in the circuit 23 to reduce the voltage or amperage of the current. When the switch or lamp is turned off, the electric current in the apparatus is disconnected. I find in practice that it is well to first permit the treated water to pass through linen, bolting-cloth, or other fabric 24, so as to strain any dead matter or other ingredients which have been rendered harmless or which may have coagulated. The strained water will then pass downward through any strata 25 26, and thereby supports 26ª, provided for filtration into a compartment 27 below the filtering means, from which it may be drawn by a faucet 28, as usual.

Fig. 5 shows a duplex system of treating water electrically on a larger scale, one tank being shown in section and the other one in side elevation. The arrangements of the metallic strips 3 4 and connections are substantially as hereinbefore described, except that the body 31 32 33 is made of wood. The water is regulated by cocks at the inlet 29 and outlet 30. The strips forming the spiral channels may be of tinned iron or other metal, being less expensive than aluminium. The electrical connections which when the current is turned on converts the metal strips into anodes and cathodes are arranged in the same manner as in the apparatus used for domestic purposes.

Such being the construction of my improved apparatus, the operation is as follows: When water is passed down through the fitting and hollow projection 10, it enters the outer convolution of the spiral channel, taking the course indicated by arrows in Fig. 2. The sides of the channel being formed of metallic strips which are respectively energized by negative and positive electrical currents, any mineral or other matter contained in the water capable of being electrically affected is treated in the circuitous path that the water is compelled to take. The water having reached the center of the apparatus, it is compelled to enter and pass along a second channel until it finds an outlet through the check-valve 13 below the apparatus. The friction of the water against the sides of the channel sets up a rotary motion, whereby the water is brought in closer and better contact with the anodes and cathodes than where a larger body of water is treated in a straight chamber or in a chamber not having the superficial area of the spiral channels which I employ. The battery being removed or distant from the apparatus, the treated water is not subjected to the fumes or gases arising from the battery, as is the case where the battery forms part of and is contained within an electrolytic water-purifying apparatus. By changing the electric wires at the poles the current may be reversed, or a reversing-switch 34 of ordinary construction can be placed somewhere in the circuit for this purpose.

When it is desired to repair or clean the apparatus, the cap is removed, the electrical connections are unfastened, and the bolts unscrewed from the nuts. The cover is lifted from the body, and the metallic strips can be removed and new ones instantly inserted without the use of any tools. The cover is replaced, the electrical connections are made, the cap is fastened to the cover, and the apparatus is ready for operation again.

In the tanks shown in Fig. 5 the above description for replacing metallic channels is modified, there being no cap to remove.

Such being the description of my invention, what I claim as new is—

1. In an apparatus for electrically treating water, a separable body or casing with inlet and outlet openings, the opposite heads or walls of said body portion being formed of insulating material and having oppositely-arranged grooves, plates or strips of electrically-conductive material removably seated edgewise in said grooves, whereby when the body or casing is separated, the plates may be removed, and means for conducting an electric current to the plates or strips, substantially as described.

2. In an apparatus for electrically treating water, a casing provided with a body portion, an insulating-cover, a plurality of spirally-arranged metallic strips or plates secured between the lower part of the casing and the insulating-cover, the inner terminals of said spiral metallic plates or strips being arranged near the center of the receptacle and the outer ends of said strips or plates extending to the sides of the receptacle, and means for supplying electric current to said plates or strips; substantially as described.

3. In an apparatus for purifying water electrically, a receptacle having inlet and outlet openings, a plurality of spiral metallic strips or plates forming channels parallel to each other, the inner terminals of which are near the center of the receptacle and adjacent each other, means for admitting water into the outer convolutions of one of the channels, the water passing through said channels in a rotary movement toward the center where it enters a secondary channel in a reverse direction, flowing toward the periphery of the receptacle, through the outlet-opening, and means for supplying electric current to the plates or strips; substantially as described.

4. In a water-purifying apparatus, the combination with a hollow casing having a removable wall, said removable wall and the wall opposite the same being formed of insulating material with oppositely-placed grooves therein, metallic plates or strips with their edges resting in said grooves, and means for conducting an electric current to the plates or strips; substantially as described.

5. In an apparatus for electrically treating water, a separable body as described, each component part being provided respectively with an inlet and an outlet opening, and having a plurality of spiral grooves on its inner surface, said grooves being opposite to and on a line with each other when the parts of said body are placed together, in combination with a plurality of coiled metallic strips adapted to be seated edgewise in the said grooves, and means for electrically connecting said strips with opposite poles of a source of electric supply, substantially as described.

6. In combination with a filter, a lid therefor comprising a hollow separable body of insulating material, an inlet and outlet to said body, said body being adapted to receive water under pressure and carry it to the filter, a pair of substantially parallel metal strips forming two coils mounted in said body in such a manner as to form two channels, and means carried by opposite ends of said strips to connect said strips to an electrical supply.

7. In an apparatus for the purpose described, a hollow separable body composed of insulating material, spiral grooves in the upper and lower interior sides of said body, a pair of spiral metallic coils fitting in said grooves and having their outer ends secured in the sides of the body and their inner ends extending to the center thereof, and an electrical connecting means connected to said coils.

8. In an apparatus for the purpose described, a hollow separable body composed of insulating material, spiral grooves in the upper and lower interior sides of said body, a pair of spiral metallic coils fitting in said grooves and having their outer ends secured in the sides of the body and their inner ends extending to the center thereof, said coils being so arranged as to allow water to flow in one direction toward the center and then reverse and allow it to flow toward the outer side without traversing the same channel more than once, an inlet to one channel, an outlet to the other channel, and an electrical source having its positive and negative connected, respectively, to the coils.

In testimony whereof I have signed my name to this specification, in the presence of two subscribing witnesses, this 6th day of May, 1901.

HENRY C. BAILEY

Witnesses:
PERRY GLEASON.
CHAS. P. ALBER.